United States Patent
Sugimoto et al.

(10) Patent No.: US 7,239,951 B2
(45) Date of Patent: Jul. 3, 2007

(54) APPARATUS FOR AUTOMATICALLY ADJUSTING DIRECTION OF LIGHT AXIS OF VEHICLE HEADLIGHT

(75) Inventors: Toshio Sugimoto, Okazaki (JP);
Takamichi Nakase, Gamagoori (JP);
Ayako Goto, Nagoya (JP)

(73) Assignee: DENSO Corporation, Kariya (JP)

( * ) Notice: Subject to any disclaimer, the term of this patent is extended or adjusted under 35 U.S.C. 154(b) by 259 days.

(21) Appl. No.: 10/995,246

(22) Filed: Nov. 24, 2004

(65) Prior Publication Data
US 2005/0131608 A1 Jun. 16, 2005

(30) Foreign Application Priority Data
Dec. 12, 2003 (JP) ............... 2003-415359

(51) Int. Cl.
*G06F 7/00* (2006.01)
*F21V 21/28* (2006.01)

(52) U.S. Cl. ............ 701/49; 701/36; 362/37; 362/465

(58) Field of Classification Search .......... 701/36, 701/49; 307/9.1, 10.1; 362/37–41, 465–467; 315/82; 702/150
See application file for complete search history.

(56) References Cited

U.S. PATENT DOCUMENTS

| | | | |
|---|---|---|---|
| 4,559,036 A | 12/1985 | Wunsch | |
| 5,857,657 A | 1/1999 | Yamamoto | |
| 5,941,489 A | 8/1999 | Fanelli et al. | |
| 6,183,118 B1 * | 2/2001 | Toda et al. | 362/465 |
| 6,357,898 B1 * | 3/2002 | Toda et al. | 362/466 |
| 6,392,218 B1 * | 5/2002 | Kuehnle | 250/208.1 |
| 6,430,521 B1 * | 8/2002 | Toda | 702/150 |
| 6,445,085 B1 * | 9/2002 | Toda et al. | 307/10.8 |
| 6,688,761 B2 * | 2/2004 | Kondo et al. | 362/466 |
| 6,984,060 B2 * | 1/2006 | Baba et al. | 362/467 |
| 2005/0148869 A1 | 7/2005 | Masuda | |

FOREIGN PATENT DOCUMENTS

| | | |
|---|---|---|
| CA | 2045070 | 2/1992 |
| JP | 2002-178828 | 6/2002 |

OTHER PUBLICATIONS

Northeast Medical Systems Corporation Universal Adjustable T-Rail Table Bracket KMA 350 Installation and Operation Instructions, 1999, Manual prepared by Medrad, no month.

* cited by examiner

*Primary Examiner*—Y. Beaulieu
(74) *Attorney, Agent, or Firm*—Posz Law Group, PLC (57) ABSTRACT

An apparatus for automatically adjusting a direction of a headlight of a vehicle includes a steered angle sensor detecting a steered angle of a steering wheel of a vehicle, a vehicle speed sensor detecting a speed of the vehicle, a control unit performing a swivel control by which the direction of the light axis of the headlight is adjusted to a target direction depending on the steered angle and the vehicle speed, and a variance calculating device calculating a variance of the steered angle detected by the steered angle sensor. The control unit halts the swivel control unit when the variance calculated by the variance calculating device exceeds a predetermined threshold.

7 Claims, 6 Drawing Sheets

APPARATUS FOR AUTOMATICALLY ADJUSTING DIRECTION OF LIGHT AXIS OF VEHICLE HEADLIGHT

CROSS-REFERENCE TO RELATED APPLICATION

This application is related to Japanese Patent Application No. 2003-415359 filed on Dec. 12, 2003, the contents of which are hereby incorporated by reference.

BACKGROUND OF THE INVENTION

1. Field of the Invention

The present invention relates to an apparatus for automatically adjusting a light axis or lighting area of a light beam emitted from a vehicle headlight in the horizontal direction on the basis of a steered angle of a steering wheel of the vehicle.

2. Description of Related Art

Automatically adjusting a direction of a light axis of a vehicle headlight is known as disclosed in Japanese Patent Application Laid-Open No. 2002-178828.

This document discloses a swivel control technique for horizontally adjusting a direction of a light axis of a headlight of a vehicle, which is characterized in that the adjustment is halted upon detecting that the angular position (steered angle) of the steering wheel of the vehicle and the traveling direction of the vehicle do not accord with each other, or detecting that the vehicle is slipping.

However, the swivel control technique disclosed in this document has a problem in that there occurs unexpected movements in the light axis of the vehicle head light when the vehicle is running on a snowy road, or a gravel road, or a road with wheel ruts, since the steering wheel tends to move in these circumstances despite the intentions of the driver.

SUMMARY OF THE INVENTION

In one aspect of the invention, the apparatus for automatically adjusting a direction of a light axis of a vehicle headlight has a configuration including:

a steered angle sensor detecting a steered angle of a steering wheel of a vehicle;

a vehicle speed sensor detecting a speed of the vehicle;

a control unit performing a swivel control by which the direction of the light axis of the headlight is adjusted to a target direction depending on the steered angle detected by the steered angle sensor and the vehicle speed detected by the vehicle speed sensor; and a variance calculating device calculating a variance of the steered angle detected by the steered angle sensor;

wherein the control unit halts the swivel control unit when the variance calculated by the variance calculating device exceeds a first threshold.

With this configuration, it becomes possible to suppress unintended fluctuations of the directions of the light axes of the vehicle headlights when the vehicle is running on a snowy road, or a gravel road, or a road with wheel ruts.

The configuration may further include a variation calculating device calculating a variation per unit time of the steered angle detected by the steered angle sensor, so that the variance calculating device calculates the variance on the basis of the variations of the steered angle of the steering wheel which the variation calculating device calculates at predetermined time intervals for a predetermined time period.

The control unit may resume the swivel control when the variance calculated by the variance calculating device falls below a second threshold smaller than the first threshold.

In another aspect of the invention, the apparatus for automatically adjusting a direction of headlight of a vehicle has a configuration including:

a steered angle sensor for detecting a steered angle of a steering wheel of a vehicle;

a vehicle speed sensor for detecting a speed of the vehicle;

a control unit performing a swivel control by which the direction of the light axis of the headlight is adjusted to a target direction depending on the steered angle detected by the steered angle sensor and the vehicle speed detected by the vehicle speed sensor;

a parameter sensing device sensing a parameter responsive to an attitude of the vehicle in a horizontal direction; and a variance calculating device calculating a variance of the parameter sensed by the parameter sensing device;

wherein the control unit halts the swivel control unit when the variance calculated by the variance calculating device exceeds a first threshold.

The configuration may further include a variation calculating device calculating a variation per unit time of the parameter sensed by the parameter sensing device, so that the variance calculating device calculates the variance on the basis of the variations of the steered angle of the steering wheel which the variation calculating device calculates at predetermined time intervals for a predetermined time period.

The control unit may resume the swivel control when the variance calculated by the variance calculating device falls below a second threshold smaller than the first threshold.

The parameter may include at least one of a signal indicative of a difference between a right wheel speed and a left wheel speed of the vehicle, a signal indicative of a yaw rate of the vehicle, and a signal indicative of a lateral acceleration of the vehicle.

PREFERRED EMBODIMENTS OF THE INVENTION

Figure 1:
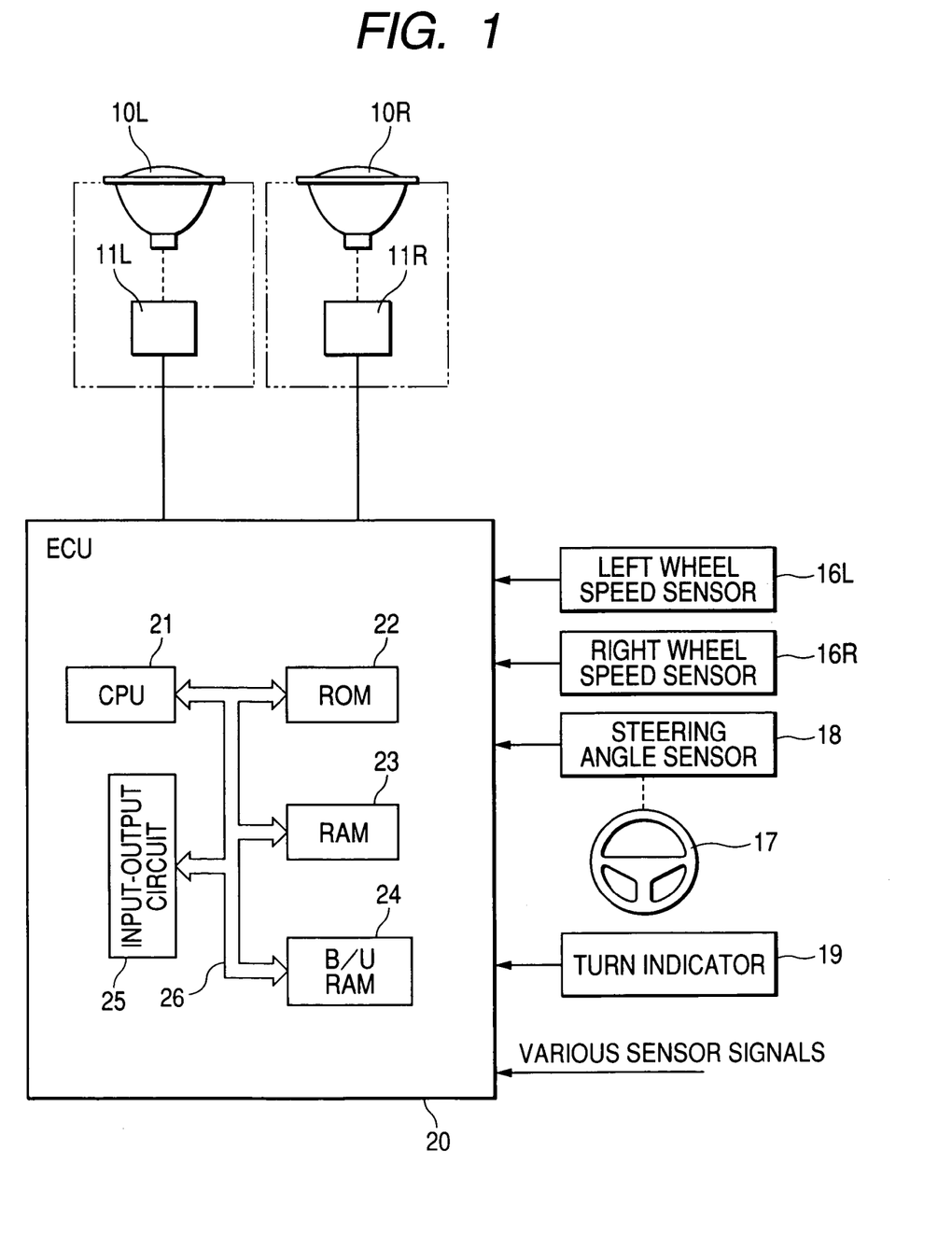
FIG. 1 is a schematic view showing an overall structure of an apparatus for automatically adjusting a direction of a light axis of a vehicle headlight according to an embodiment of the invention.

FIG. 1 shows an overall structure of an apparatus for automatically adjusting a direction of a light axis of a vehicle headlight according to an embodiment of the invention.

In this drawing, 10L and 10R denote left and right vehicle headlights, respectively. The headlights 10L and 10R are linked to actuators 11L and 11R for adjusting the directions of the light axes of the headlights 10L and 10R. An ECU (Electronic Control Unit) 20 includes a CPU 21 for executing various processings, a ROM 22 for storing control programs, control maps, etc., a RAM 23 for temporarily storing various data, a B/U (Back Up) RAM 24, an input-output circuit 25, and a bus line 26 for connecting these elements.

The ECU 20 receives an output signal from a left wheel speed sensor 16L detecting a left wheel speed SPDL, an output signal from a right wheel speed sensor 16R detecting a right wheel speed SPDR, an output signal from a steered angle sensor 18 detecting a steered angle (angular position) STA of a steering wheel 17, and various sensor signals from other sensors, not illustrated. The actuators 11L and 11R act to adjust horizontally the directions of the light axes of the headlights 10L and 10R in accordance with signals outputted from the ECU 20.

Figure 2:
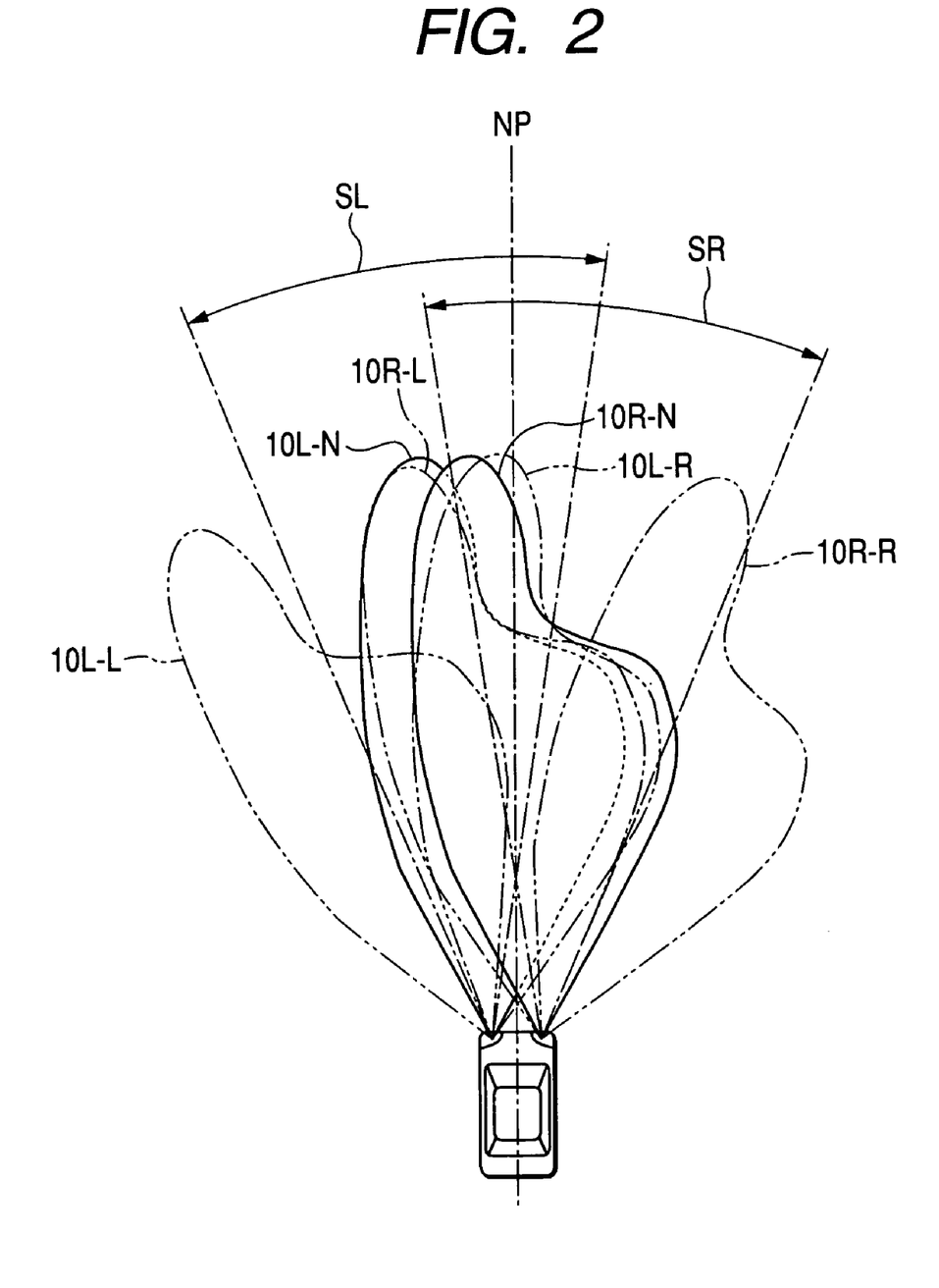
FIG. 2 is an explanatory view for explaining beam patterns of the headlights adjusted by the apparatus according to the embodiment of the invention.

FIG. 2 shows beam patterns of the headlight 10R and 10L (low beam). In this figure, the heavy solid line 10L-N represents a beam pattern of the headlight 10L when the steering wheel is in its neutral angular position. The arched arrow SL represents a swivel range within which the light axis of the headlight 10L can be swiveled in accordance with the steering angle of the steering wheel. The chain double-dashed lines 10L-R and 10L-L represent beam patterns of the headlight 10L when the light axis of the headlight 10L is in the rightmost position and the leftmost position within the swivel range, respectively. The heavy solid line 10R-N represents a beam pattern of the headlight 10R when the steering wheel is in the neutral angular position. The arched arrow SR represents a swivel range within which the light axis of the headlight 10R can be swiveled in accordance with the steering angle of the steering wheel. The chain double-dashed lines 10R-R and 10R-L represent beam patterns of the headlight 10R when the light axis of the headlight 10R is in the rightmost position and the leftmost position within the swivel range, respectively.

The swivel ranges SL and SR should provide the driver with good visibility in the leftward or rightward direction when the driver turns the steering wheel to the left or right without a sacrifice of visibility in the forward direction. Accordingly, as shown in FIG. 2, a portion of the swivel range SR at the right of the initial angular position is wider than that of the swivel range SL so that the variation of the light axis of the headlight 10R is larger than that of the headlight 10L when the driver turns the steering wheel to the right. On the other hand, a portion of the swivel range SL at the left of the initial angular position is wider than that of the swivel range SR so that the variation of the light axis of the headlight 10L is larger than that of the headlight 10R when the driver turns the steering wheel to the left.

Next, the swivel control routine which the CPU 21 of the ECU 20 performs is explained below with reference to the flowchart shown in FIG. 3, and the time chart shown in FIG. 4. FIG. 4 is a time chart showing progressions over time of the left and right wheel speeds SPDL, SPDR, the steered angle STA of the steering wheel 17, a variation x of the steered angle STA, and a variance V of the steered angle STA when the vehicle is running straight on a road with wheel ruts. In this embodiment, the variance V is calculated on the basis of the values of the steered angle variation x within the last one-second period. The CPU 21 performs this swivel control routine at regular intervals, for example, once every 5 msec.

Figure 3:
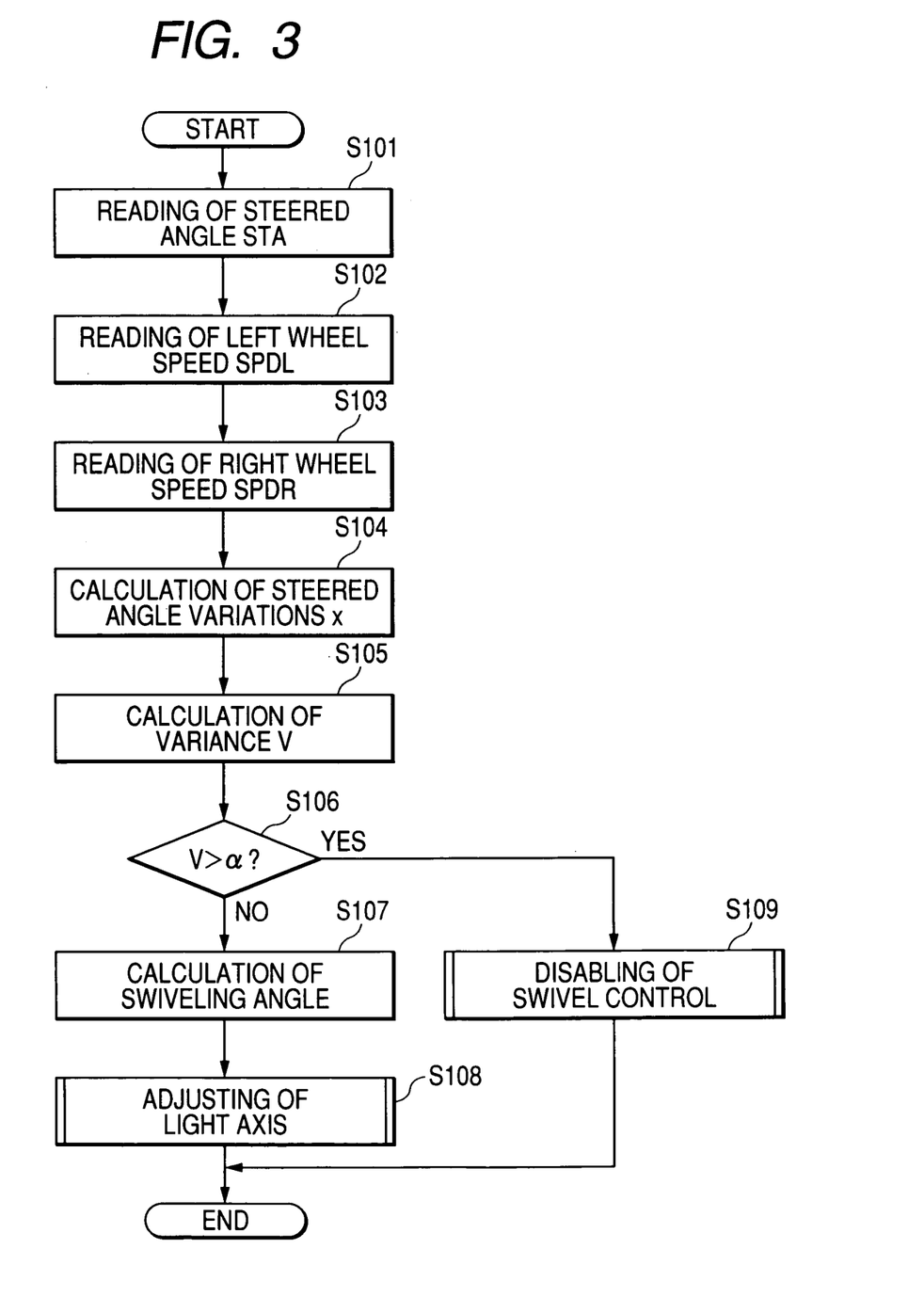
FIG. 3 is a flowchart for explaining the swivel control routine performed by a CPU within an ECU included in the apparatus according to the embodiment of the invention.
Figure 4:
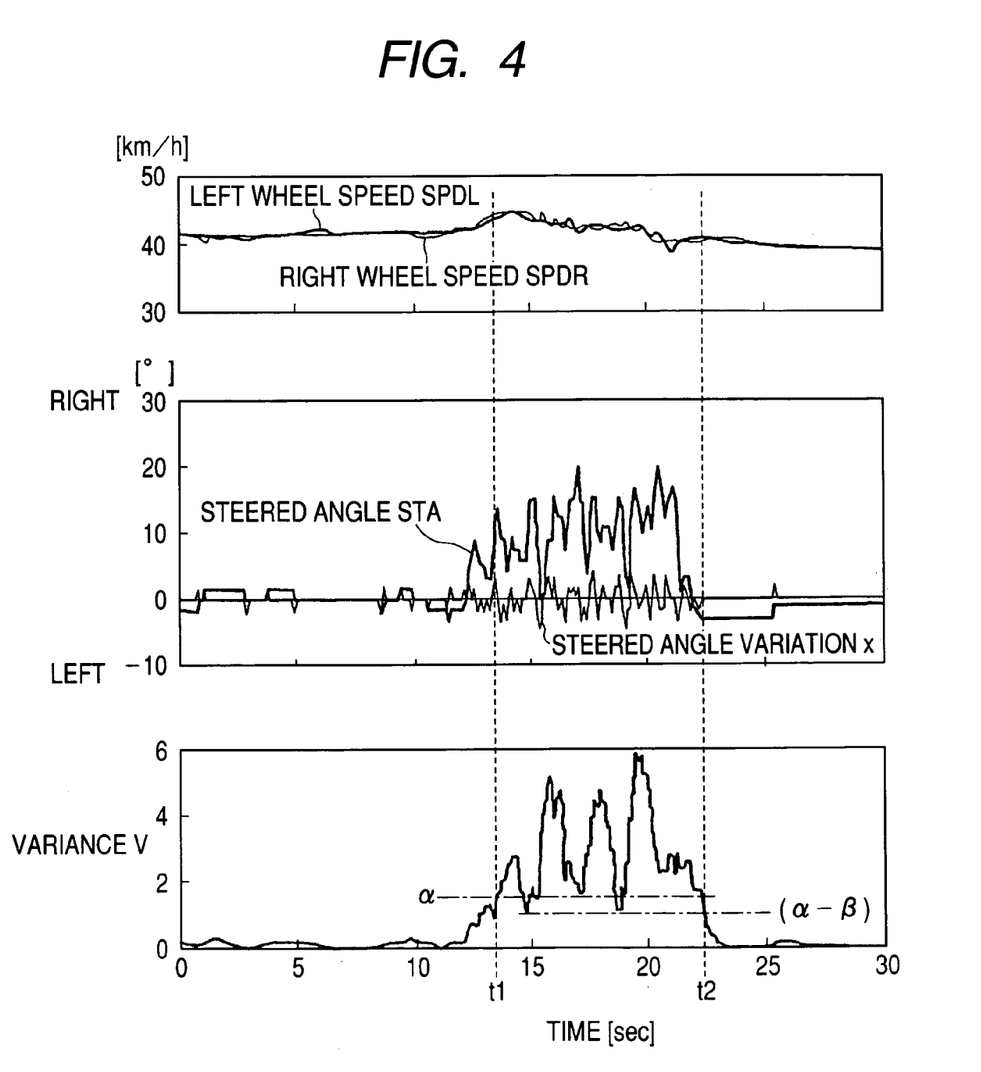
FIG. 4 is a time chart showing progressions over time of left and right wheel speeds, a steered angle of a steering wheel, and a variance of the steered angle when a vehicle is running straight on a road with wheel ruts.

As shown in FIG. 3, the steered angle STA detected by the steered angle sensor 18 is read at step S101. Next, the left wheel speed SPDL detected by the left wheel speed sensor 16L is read at step S102. Subsequently, the right wheel speed SPDR detected by the right wheel speed sensor 16R is read at step S103. After that, the steered angle variation x, that is, the variation rate of the steered angle STA per unit time which a variation calculation device included in the ECU 20 calculates by the following equation (1) on the basis of the steered angle STA(i) detected at the instant detection time T(i) and the steered angle STA(i−1) detected at the previous detection time T(i−1).

$$x=\{STA(i)-STA(i-1)\} \quad (1)$$

Subsequently, a variance calculating device included in the ECU 20 calculates the variance V by the following equation (2) at step S105. Here, n is the number of data pieces depending on the sampling interval and the time period (one second in this embodiment), the values of the steered angle variation x within which are used for this calculation.

$$V=\{n\Sigma x^2-(\Sigma x)^2\}/n^2 \quad (2)$$

After that, the process goes to step S106 where it is determined whether or not the variance V calculated at step S105 is not larger than a threshold $\alpha$. In this embodiment, $\alpha$ is set at 1.5. However, $\alpha$ a may be determined depending on the type of the vehicle. If the variance V is not larger than the threshold $\alpha$ (before the time t1, or after the time t2 in FIG. 4), it means that the actual variation of the steered angle STA of the steering wheel 17 is small. That is, when the variance V is smaller than the threshold $\alpha$, it can be determined that the vehicle is running straight on the road with no wheel ruts and the movement of the steering wheel 17 against the driver's intention is small.

Accordingly, if it is determined that the variance V is not larger than the threshold $\alpha$ at step S106, then the process goes to step S107 for calculating the swiveling angle SWC on the basis of the steered angle STA read at step S101, the left wheel speed SPDL read at step S102 and the right wheel speed SPDR read at step S103.

Subsequently, the process goes to step S108 where the actuators 11L, 11R receive the output signals corresponding to the swiveling angle SWC calculated at step S107 from the ECU 20, and act to adjust the directions of the light axes of the headlights 10L, 10R by the angles corresponding to the received signals to complete the swivel control routine.

On the other hand, if the variance V is larger than the threshold $\alpha$ ((between the time t1 and the time t2 in FIG. 4), it means that the actual variation of the steered angle STA of the steering wheel 17 is large. That is, when the variance V is larger than the threshold $\alpha$, it can be determined that the vehicle is running on a road with wheel ruts and the movement of the steering wheel 17 against the driver's intention is large. Accordingly, if it is determined that the variance V is larger than the threshold $\alpha$ at step S106, then the process goes to step s109 for disabling the actuators 11L, 11R from adjusting the directions of the light axes of the headlights 10L, 10R to complete the swivel control routine.

Although not shown in the flowchart of FIG. 3, the process goes from step S106 to step S109 only when the variance V exceeds the threshold α for a predetermined time period continuously. It is for preventing the actuators 11L, 11R from being disabled due to noise. Furthermore, the step S106 has hysteresis characteristics. More specifically, once the process goes from step S106 to step s109, the variance V has to fall below (α-β) for the process to go to step S107, β being a predetermined positive value (0.25 for example) smaller than the threshold α. Accordingly, the actuators 11L, 11R are kept disabled between the time t1 and the time t2 shown in FIG. 4.

Furthermore, if the process goes to step S109 while the actuators 11L, 11R are acting to adjust the directions of the light axes of the headlights 10L, 10R, a filtering process depending on the vehicle speed SPD at this moment is performed so that the directions of the light axes of the headlights 11L, 11R gradually return to their initial directions.

If a high-accuracy wheel speed sensor is used for the left and right wheel speed sensors, it is possible to detect the difference between the left wheel speed SPDL and the right wheel speed SPDR with precision. In this case, the same swivel control can be performed by using the difference between the left wheel speed SPDL and the right wheel speed SPDR instead of the steered angle STA.

In this embodiment, the variance V is calculated on the basis of the variations of the steered angle. However, the present invention should not be construed as being limited thereto. The variance may be calculated by any known statistical analysis.

Figure 5:
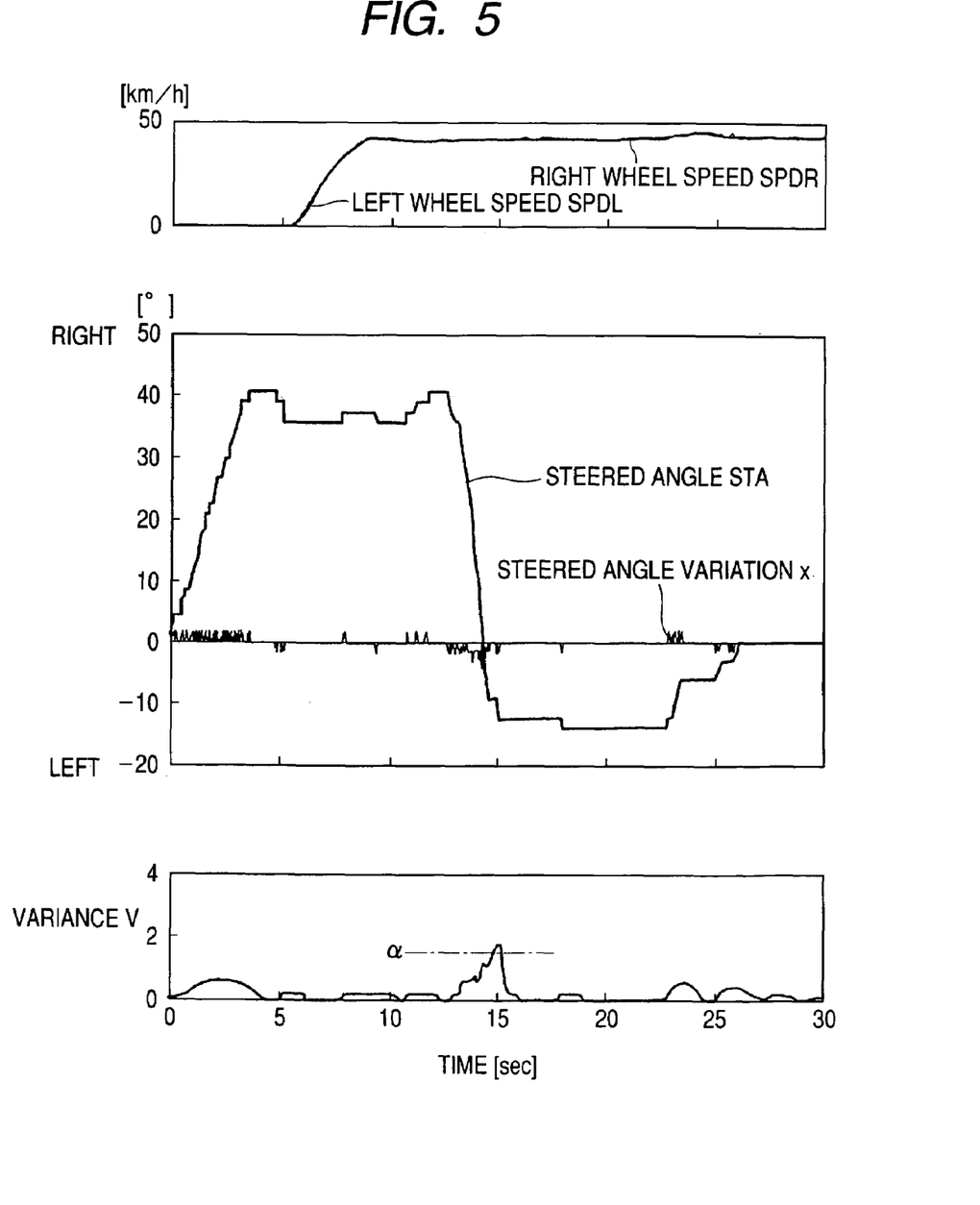
FIG. 5 is a time chart showing progressions over time of left and right wheel speeds, a steered angle of a steering wheel, a steered angle variation, and a variance of the steered angle when a vehicle makes S-turns on a road with no wheel ruts.
Figure 6:
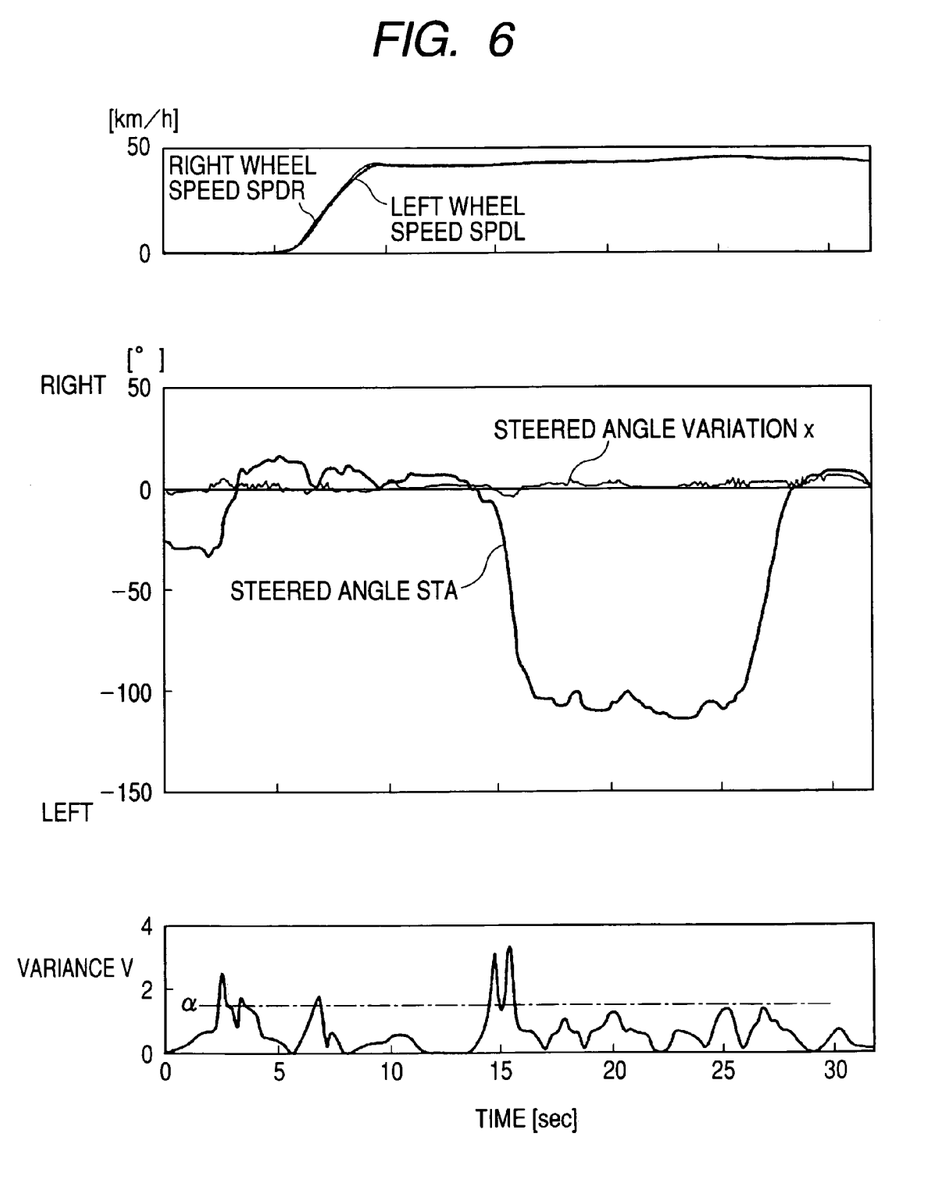
FIG. 6 is a time chart showing progressions over time of left and right wheel speeds, a steered angle of a steering wheel, a steered angle variation, and a variance of the steered angle when the vehicle makes an R30 (30-m radius) turn.

Other actual examples of the variance V of the steered angle STA are explained below with reference to FIGS. 5 and 6. FIG. 5 shows progressions over time of the left and right wheel speeds SPDL, SPDR, steered angle STA, steered angle variation x, and the variance V when the vehicle makes S-turns on a road with no wheel ruts. FIG. 6 shows progressions over time of sames when the vehicle makes an R30 (30-m radius) turn. In both the cases of FIG. 5 and FIG. 6, the variance V is calculated from the values of the steered angle variation x over one-second period just before the instant calculation as in the case of FIG. 4.

In the case of FIG. 5, the steered angle STA of the steering wheel 17 exhibits large variations due to the driver's manipulation of the steering wheel 17 along the road, however, the steered angle variation x only exhibits only slight variation. Accordingly, the variance V obtained from the steered angle variation x does not exceed the threshold α. In consequence, the actuators 11L, 11R are not disabled, because the condition of V<α does not hold at step S106. Although the variance V exceeds the threshold a momentarily, the process does not go to step S109 for the reason explained above.

Also in the case of FIG. 6, the steered angle STA of the steering wheel 17 exhibits large variations due to the driver's manipulation of the steering wheel 17 along the R30 road, however, the steered angle variation x only exhibits a slight variation. Accordingly, the variance V obtained from the steered angle variation x does not exceed the threshold α. In consequence, the actuators 11L, 11R are not disabled, because the condition of V<α does not hold at step S106. Also in the case of FIG. 6, the variance V exceeds the threshold α momentarily, however, the process does not go to step S109 for the reason explained above.

As explained above, the apparatus for automatically adjusting the direction of the light axis of a headlights (10L, 10R) of a vehicle according to the embodiment of the invention has a structure including: a steered angle sensor (18) detecting a steered angle (STA) of a steering wheel (17), vehicle speed sensors (16L, 16R) detecting a speed of the vehicle; a control unit (20) performing a swivel control by which the directions of the light axes of the headlights are adjusted to target directions depending on the steered angle of the steering wheel detected by the steered angle sensor and the vehicle speed detected by the vehicle speed sensors, a variance calculating device (20) calculating a variance (V) of the steered angle detected by the steered angle sensor, wherein the control unit halts the swivel control when the variance calculated by the variance calculating device exceeds a predetermined threshold (α).

In this embodiment, it is determined that the vehicle is running on a road with wheel ruts, if the variance V of the steered angle STA exceeds the predetermined threshold α. In this case, the swivel control for adjusting the directions of the light axes of the headlights 10L, 10R is disabled, because the steered angle or the angular position of the steering wheel 17 is affected by the wheel ruts even when the vehicle is in a straight running state. Thus, it becomes possible to avoid unintended fluctuations of the directions of the light axes of the headlights 10L, 10R.

Although the execution of the swivel control is determined on the basis of the variance V calculated from the steered angle variations x, the present invention should not be construed as being limited thereto. Any parameter responsive to the vehicle's attitude in the horizontal direction can be used for determining the execution of the swivel control.

That is, the apparatus for automatically adjusting directions of headlights (10L, 10R) of a vehicle of the invention may have a structure including a steered angle sensor (18) detecting a steered angle (STA) of a steering wheel (17), vehicle speed sensors (16L, 16R) detecting a speed of the vehicle; a control unit (20) performing a swivel control by which the directions of the light axes of the headlights are adjusted to target directions depending on the steered angle detected by the steered angle sensor and the vehicle speed detected by the vehicle speed sensors, a parameter sensing device included in the control unit (20) for sensing a parameter responsive to an attitude of the vehicle in a horizontal direction, a variance calculating device (20) calculating a variance (V) of the parameter sensed by the parameter sensing device, wherein the control unit halts the swivel control when the variance calculated by the variance calculating device exceeds a predetermined threshold (α).

The parameter may be a differential speed between the left and right wheels outputted from the left and right wheel speed sensors 16L, 16R, or a yaw rate signal indicative of a yaw rate of the vehicle outputted from a yaw rate sensor (not illustrated), or a lateral acceleration signal indicative of a lateral acceleration of the vehicle outputted from a lateral acceleration sensor (not illustrated). The parameter may be a combination of these signals.

The above explained preferred embodiments are exemplary of the invention of the present application which is described solely by the claims appended below. It should be understood that modifications of the preferred embodiments may be made as would occur to one of skill in the art.

What is claimed is:

1. An apparatus for automatically adjusting a direction of a light axis of a headlight of a vehicle comprising:

a steered angle sensor detecting a steered angle of a steering wheel of said vehicle;

a vehicle speed sensor detecting a speed of said vehicle;

a control unit performing a swivel control by which said direction of said light axis of said headlight is adjusted to a target direction depending on said steered angle detected by said steered angle sensor and said vehicle speed detected by said vehicle speed sensor; and a variance calculating device calculating a variance of said steered angle detected by said steered angle sensor;

wherein said control unit halts said swivel control unit when said variance calculated by said variance calculating device exceeds a first threshold.

2. An apparatus for automatically adjusting a direction of a headlight of a vehicle according to claim 1, further comprising a variation calculating device calculating a variation per unit time of said steered angle detected by said steered angle sensor, said variance calculating device calculating said variance on the basis of variations of said steered angle detected by said steered angle sensor which said variation calculating device calculates at predetermined time intervals for a predetermined time period.

3. An apparatus for automatically adjusting a direction of a headlight of a vehicle according to claim 1, wherein said control unit resumes said swivel control when said variance calculated by said variance calculating device falls below a second threshold smaller than said first threshold.

4. An apparatus for automatically adjusting a direction of a light axis of a headlight of a vehicle comprising:

a steered angle sensor far detecting a steered angle of a steering wheel of said vehicle;

a vehicle speed sensor for detecting a speed of said vehicle;

a control unit performing a swivel control by which said direction of said light axis of said headlight is adjusted to a target direction depending on said steered angle detected by said steered angle sensor and said vehicle speed detected by said vehicle speed sensor;

a parameter sensing device sensing a parameter responsive to an attitude of said vehicle in a horizontal direction; and a variance calculating device calculating a variance of said parameter sensed by said parameter sensing device;

wherein said control unit halts said swivel control unit when said variance calculated by said variance calculating device exceeds a first threshold.

5. An apparatus for automatically adjusting a direction of a headlight of a vehicle according to claim 4, further comprising a variation calculating device calculating a variation per unit time of said parameter sensed by said parameter sensing device, said variance calculating device calculating said variance on the basis of variations of said steered angle detected by said steered angle sensor which, said variation calculating device calculates at predetermined time intervals for a predetermined time period.

6. An apparatus for automatically adjusting a direction of a headlight of a vehicle according to claim 4, wherein said control unit resumes said swivel control when said variance calculated by said variance calculating device falls below a second threshold smaller than said first threshold.

7. An apparatus for automatically adjusting a direction of a headlight of a vehicle according to claim 4, wherein said parameter includes at least one of a signal indicative of a difference between a right wheel speed and a left wheel speed of said vehicle, a signal indicative of a yaw rate of said vehicle, and a signal indicative of a lateral acceleration of said vehicle.

* * * * *